United States Patent

[11] 3,563,413

[72] Inventor William Gordon
     Silver Spring, Md.
[21] Appl. No. 836,237
[22] Filed June 25, 1969
[45] Patented Feb. 16, 1971
[73] Assignees Alex Logar
     Bethesda, Md.
     a part interest;
     B. P. Fishburne, Jr.
     Washington, D.C., a part interest

[54] CONTAINER DISPENSING DEVICE
     9 Claims, 7 Drawing Figs.
[52] U.S. Cl............................................. 222/83.5;
                                                     222/213
[51] Int. Cl................................................ B67b 7/28
[50] Field of Search...................................... 222/83.5,
                                                     213, 444, 568

[56] References Cited
     UNITED STATES PATENTS
     1,033,861  7/1912  Beck ......................... 222/213X
     2,334,032  12/1942  Rhodes....................... 222/213

Primary Examiner—Samuel F. Coleman
Assistant Examiner—Norman L. Stack, Jr.
Attorney—B. P. Fishburne ABSTRACT: A measuring device for detachable connection to a bottle or other container for fluent materials which is fitted with a resilient cover at its outlet and a flexible slotted diaphragm adjacent to its inlet, with an actuating rod extending therebetween, so that upon momentary flexing of the cover inwardly when the container is inverted, the actuating rod opens the slots in the diaphragm to permit a desired amount of the fluent material to pass to the measuring device, and which upon release of the resilient cover, permits the slots to reclose and to seal off communication between the measuring device and the container, following which the measured contents of the measuring device may be poured therefrom by opening the cover.

PATENTED FEB 16 1971 3,563,413
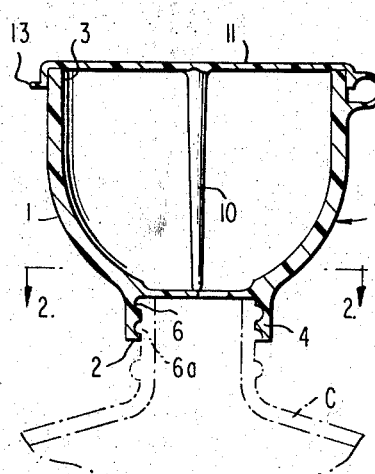
FIG.1
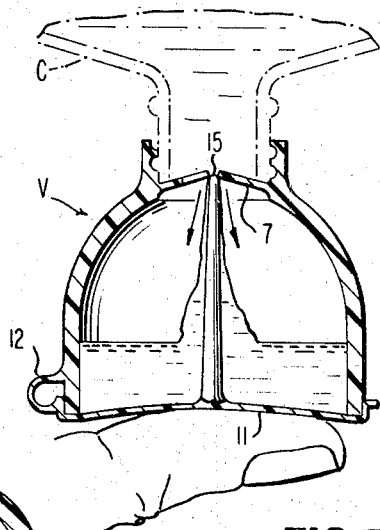
FIG.3
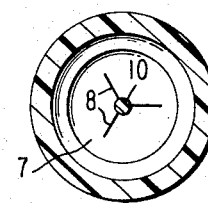
FIG.2
FIG.4
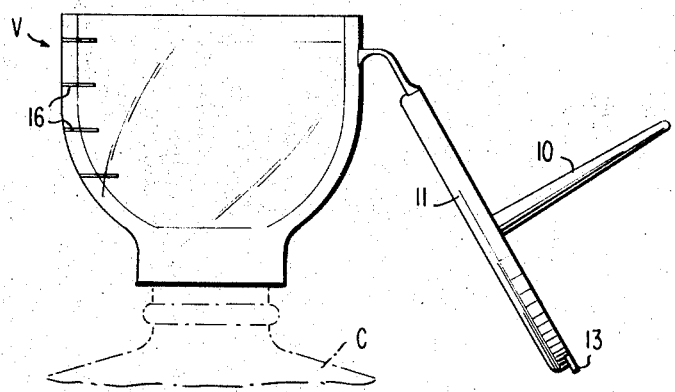
FIG.5
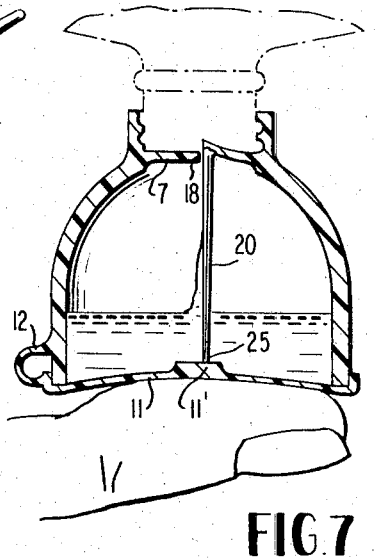
FIG.7
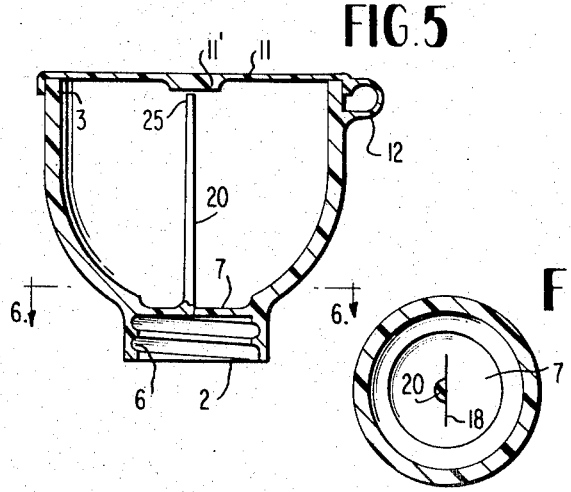
FIG.6
INVENTOR
WILLIAM GORDON
BY *Samuel Shlomf*
ATTORNEY

3,563,413

CONTAINER DISPENSING DEVICE

This invention relates to a dispensing device for fluent materials, and particularly to a measuring vessel for detachable mounting on a container to dispense measured quantities of the contents of the container to the vessel for subsequent discharge from the latter.

It is the object of the present invention to provide a dispensing device of rugged construction and low cost which may be attached to different containers of fluent materials so that limited quantities of the latter may be made to flow conveniently from the container to the measuring vessel for subsequent discharge therefrom, without intermingling or contamination of the fluent contents in the container.

It is another object of the invention to provide a measuring vessel for powdered or liquid material in a container which, upon convenient and rapid manipulation, may be made to discharge a desired quantity of the contents of the latter to the measuring vessel, which is followed by the sealing off of the contents in the container from the material which has been passed to the measuring vessel and which, upon simple manipulation of the cover for the measuring vessel, may be poured therefrom.

While the measuring vessel in accordance with the invention is applicable to the dispensing of all types of fluent materials, whether of powdered, granulated or liquid form, such as detergents, salt, sugar, baking powder, flour, flavoring extracts, etc., the same is especially useful in the dispensing of medicines, since the same is adapted to deliver predetermined dosages of medicinal contents of a container to the measuring vessel, wherefrom it may be discharged or consumed without affecting the sterile condition of the medicinal contents in the container, which the measuring vessel maintains in sealed condition by virtue of its special construction.

It is the aim of the present invention to improve upon medicinal administering devices which eliminate the need for measuring spoons and the like, of which U.S. Pat. No. 2,446,085, Jul. 27, 1948, is illustrative.

Other objects and purposes will appear from the detailed description of the invention following hereinafter, taken in conjunction with the accompanying drawings, wherein:

FIG. 1 is a sectional view of one embodiment of the invention applied to a container for fluent material;

FIG. 2 is a horizontal sectional view along line 2-2 of FIG. 1;

FIG. 3 is a vertical sectional view of the assembly shown in FIG. 1 in inverted position, illustrating the positioning of the parts at the time the material from the container passes to the dispensing device;

FIG. 4 is a front elevation of FIG. 1 showing the dispensing device with the cover separated therefrom preparatory to the discharge of the measured quantity of material therein;

FIG. 5 is a vertical sectional view of a modified embodiment of the dispensing vessel;

FIG. 6 is a horizontal sectional view along line 6-6 of FIG. 5;

FIG. 7 is a vertical sectional view of the second embodiment in the position corresponding to that shown in FIG. 3.

As shown in the drawings, the measuring vessel V comprises a receptacle 1 of suitable contour, which may resemble a cup, with an inlet 2 at one end and an outlet 3 at the mouth thereof at the opposite end. The inlet end 2 may be provided with internal threads 6 for threaded engagement with external threads 7 on the neck of the container. Alternatively, the inlet end 2 may be mounted on the neck of the container by a snap fit as is common in closure receptacles formed of plastic material. The measuring vessel V is preferably molded of plastic material, such as polyethylene.

A flexible diaphragm 7 extends across the base of the receptacle 1 and is provided with one or more slots which are self-sealing, but which may be opened when the diaphragm is flexed in the direction transverse to the plane thereof. A resilient cover 11 is preferably molded integrally with the body of the measuring vessel 1 through the intermediary of a flexible hinge 12. The cover is adapted to fit tightly over the mouth of the vessel 1, as shown in FIG. 1, or it may be easily disengaged therefrom by the provision of a tab 13, opposite hinge 12, to assume a partially open position or a fully open position, as shown in FIG. 4.

A rod 10 is molded integrally to the inner face of the cover 11, having the free end 15 thereof disposed closely adjacent to the junction of a plurality of radially disposed slots 8 in the diaphragm, three of which are indicated in FIG. 2. The resilience of the cover 11 permits an inward flexing thereof to lessen the distance between the cover and the diaphragm, so that upon the reversal of the container and vessel from the position shown in FIG. 1 to that shown in FIG. 3, and the slight inward pressure by a finger on the outer face of the cover, the end 15 of the rod 10 opens the slots 8 to a degree which permits the fluent contents of the container to flow from the latter into the measuring vessel 1 in any desired amount. This flow may be stopped quickly and accurately by releasing the pressure on the outer face of the cover 11, which returns the actuating rod 10 to its normal position displaced from the plane of diaphragm 7 and which serves to permit the slots 8 to perform their sealing function. Graduations 16 may be provided on the wall of the measuring vessel to indicate the quantity of the material which is passed from the container to the measuring vessel, in order to adjust the quantities which may be passed from one chamber to the other.

The tightness of the fit of the cover 11 on the mouth of the measuring vessel is such that the fluent material is retained by the cover until the desired quantity flows therein, whereupon the release of the pressure on the actuating rod 10 and the reversal of the assembly from the position shown in FIG. 3 to that shown in FIG. 1, serves to retain the measured quantity in the dispensing vessel without passing to the container, by virtue of the sealing action of the slots 8 in the diaphragm 7.

Thereafter, the cover 11 may be separated from the outlet mouth 3 either slightly or fully, to pour off the measured quantity of material in any desired way. In the case of medicaments, the mouth of the dispensing device may be used as a pouring lip for direct application to the mouth of a patient.

Another embodiment of the invention is illustrated in FIGS. 5 to 7 wherein like parts are designated by the same reference characters. In this case the diaphragm 7 may be provided with a single slot 18 with the actuating rod 20 molded integrally with the diaphragm 7 adjacent to the slot, with the free end 25 terminating adjacent to a protuberance 11' formed on the central portion of the inner face of the cover 11. In this case, the inward pressing of the cover 11 causes the protuberance 11' to press against the free end 25 of the actuating rod 20 to open the slot 18 adjacent to the base of actuating rod 20 so that the material from the container may flow into the vessel through this slot, as indicated in FIG. 7. The slot is automatically closed upon the release of the pressure on cover 11, to seal the passage between the container and the measuring vessel. In this case as in the preceding one, the contents of the measuring vessel may be poured off upon the separation of the cover 11 from the mouth of the vessel.

It is a characteristic of both embodiments of the invention that any desired amount of the fluent contents of a container may be transferred therefrom into the measuring vessel, without need of any extraneous devices or implements, and that the measured quantity of material in the vessel may then be poured from the latter cleanly, rapidly, and without any loss or waste thereof.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. A dispensing device for the fluent contents of a container, comprising:

a. a vessel adapted to be detachably connected to said container and provided with an inlet and an outlet;
b. means adjacent to said inlet for affixing said device to the mouth of the container;
c. a flexible slotted diaphragm across the inlet of said vessel to control the flow of the fluent contents between the container and the vessel;
d. a resilient cover across the outlet of said vessel; and
e. an actuating rod extending between said cover and diaphragm which, upon the reduction of distance therebetween, in response to the inward movement of said cover, effects an opening of the slotted diaphragm to permit the controlled flow of the material from the container to said vessel, and which upon the automatic reverse outward movement of said resilient cover, effects a closure of the slotted diaphragm and the sealing of material within the vessel against return to said container, wherefrom the material in the vessel is adapted to be dispensed from the outlet of the vessel upon the separation of the cover therefrom.

2. A device as set forth in claim 1, wherein one end of said actuating rod is integral with the inner face of said cover, and the opposite end thereof is adapted to engage said diaphragm adjacent to the slot therein to effect an opening between said container and vessel.

3. A device as set forth in claim 1, wherein one end of said actuating rod is integral with the inner face of said diaphragm adjacent to the slot therein, and the opposite end is adapted to be engaged by said cover in response to said inward movement thereof, to effect an opening between said container and vessel.

4. A device as set forth in claim 1, wherein said flexible cover is pivotally connected to said vessel.

5. A device as set forth in claim 4, wherein said flexible cover is integral with the body of said vessel.

6. A device as set forth in claim 1, wherein said vessel and flexible cover are integrally molded of plastic material with a flexible hinge interconnecting them.

7. A device as set forth in claim 1, wherein said actuating rod extends inwardly from the central portion of said cover, with the free end thereof terminating adjacent to the central portion of said diaphragm whereat converges a plurality of radially disposed slots.

8. A device as set forth in claim 3, including an inwardly directed protuberance on said cover for engaging said opposite end of the actuating rod.

9. A device as set forth in claim 1, including indicating graduations on the wall of the vessel to measure the quantity of the material passing into the vessel from the container.